Sept. 13, 1932.  C. W. BRABBÉE  1,876,601
RADIATOR
Filed April 2, 1928    3 Sheets-Sheet 1

INVENTOR
Charles W. Brabbée
BY Conrad A. Dieterich
his ATTORNEY

Sept. 13, 1932. C. W. BRABBÉE 1,876,601
RADIATOR
Filed April 2, 1928 3 Sheets-Sheet 2
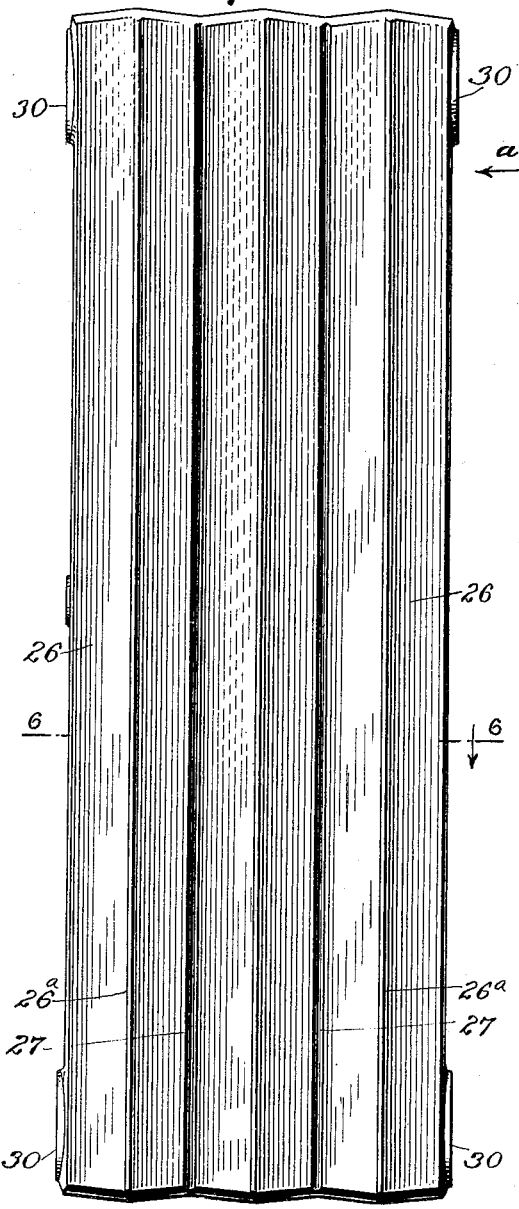
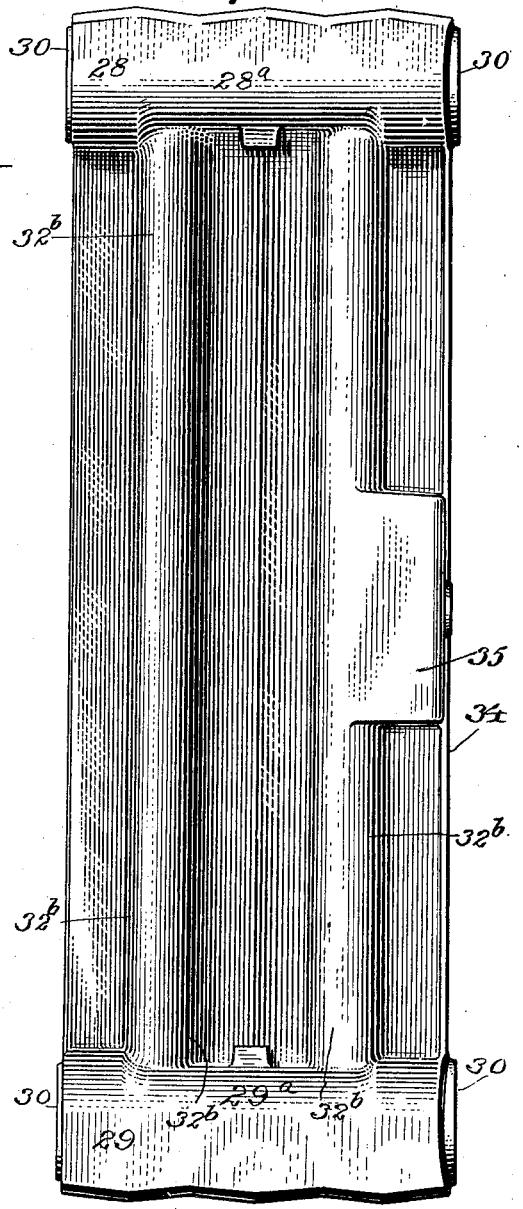
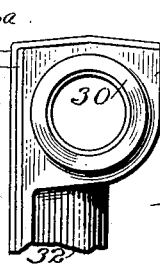

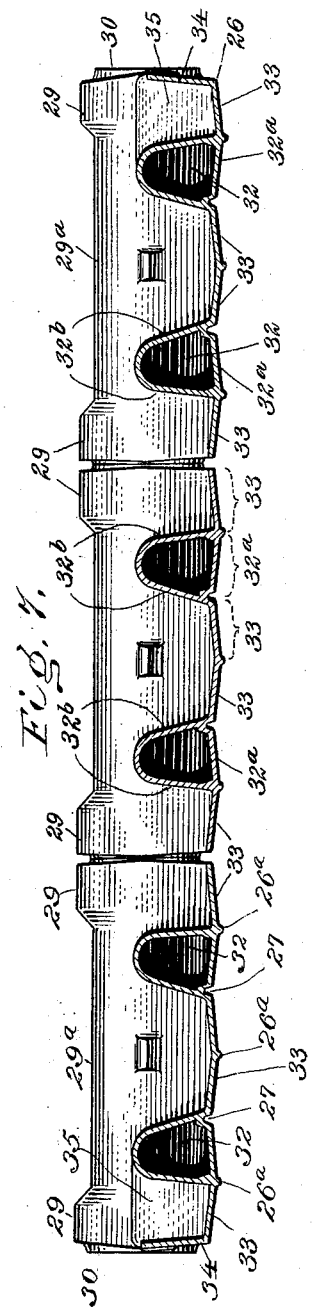

Patented Sept. 13, 1932

1,876,601

UNITED STATES PATENT OFFICE

CHARLES W. BRABBÉE, OF BRONXVILLE, NEW YORK, ASSIGNOR TO AMERICAN RADIATOR COMPANY, OF NEW YORK, N. Y., A CORPORATION OF NEW JERSEY

RADIATOR

Application filed April 2, 1928. Serial No. 266,492.

My invention relates to improvements in heating apparatus, and the same has for its object more particularly to provide a simple, efficient, and compact heating apparatus which may be conveniently inserted within shallow recesses or spaces.

Further, said invention has for its object to provide a radiator which will be inexpensive to produce, which will provide a greater radiating surface per unit of weight, and which can be made smaller and lighter than other radiators of equal rating without impairing its efficiency as a medium for the transfer of useful heat.

Further, said invention has for its object to provide a radiator section in the form of a relatively shallow panel or element having a substantially smooth or flat outer exposed surface presenting a plurality of parallel narrow portions or bands of direct and indirect heating surfaces disposed in alternating arrangement.

Further, said invention has for its object to provide a radiator section in the form of a relatively shallow panel having a plurality of parallel conduit portions arranged in spaced relation upon one side of said panel and separated from one another by intervening panel portions of about double the width of one of said conduit portions.

Further, said invention has for its object to provide a radiator section in the form of a relatively shallow panel having a plurality of parallel, spaced conduit portions extending rearwardly therefrom, and in which each of said conduit portions has substantially one-third of its longitudinal wall portion incorporated with, and formed as a part of said panel, and the remainder of the longitudinal wall portion of said conduit projecting a short distance from and beyond the rear of said panel.

Further, said invention has for its object to provide a radiator composed of a plurality of sections, each having the form of a shallow panel consisting in part of direct heating surfaces formed as integral conduit portions, and in part of indirect heating surfaces formed as intermediate portions or fins, and in which the several parts are so proportioned and arranged with respect to each other as to insure the maximum and uniform heat radiating efficiency of the panel as a whole.

Further, said invention has for its object to provide a radiator of the character specified in which its outer or exposed side will act to heat a room or chamber by radiation, while the rear or concealed portion thereof, in combination with the adjacent wall of said room or chamber, will act to heat the room or chamber by induced convection currents.

Further, said invention has for its object to provide a heating apparatus which is susceptible of being readily fitted within a shallow recess or niche in the wall of a building in such manner that its outer or exposed front portion will be flush with the wall, and the remainder of the apparatus, including its parts and attachments, be disposed wholly to the rear of said front portion and be entirely concealed from view.

Other objects will in part be obvious and in part be pointed out hereinafter.

To the attainment of the aforesaid objects and ends my invention consists in the novel details of construction, and in the combination, connection, and arrangement of parts hereinafter more fully described and then pointed out in the claims.

The installation of radiators of appropriate capacity and size in buildings in order to obtain the proper heating results is frequently rendered difficult by reason of the fact that the particular place or space available in the room is not of such size and proportion as will admit or receive a radiator of any common type having the dimensions required to provide the heating surface necessary to insure the due and proper heating of the room. This difficulty is further increased owing to the fact that when conditions require the recessing or cutting away of a portion of an outer wall sufficiently to accommodate a radiator of the required dimensions the remaining portion of such outer wall will be reduced to an extent prohibited by the building laws of various municipalities and the installation of the radiator thereby rendered impossible.

It is, therefore, one of the principal objects of my invention to provide a radiator which is adapted for use in shallow recesses and other spaces of limited area, and which is so constructed that the same will become uniformly heated, and emit the maximum amount of useful heat possible.

In the accompanying drawings wherein like numerals of reference indicate like parts—

Fig. 3 is an enlarged detail front or face view of a single radiator section;

Fig. 4 is a fragmentary end view thereof, looking in the direction of the arrow $a$, Fig. 3;

Fig. 5 is a back view thereof;

Fig. 6 is a horizontal section on the line 6—6 of Fig. 3, and

Fig. 7 is a horizontal section, similar to Fig. 6, showing a radiator construction comprising two end sections and one intermediate section.

Figure 1:
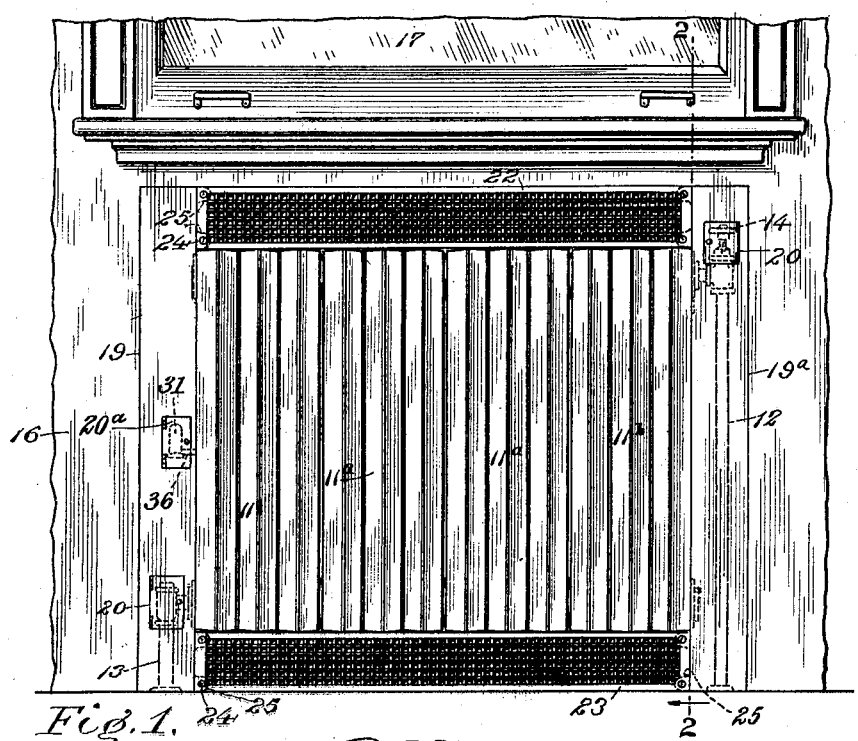
Figure 1 is a front elevation showing one form of radiator constructed according to and embodying my said invention, disposed within a recess located in a wall below a window.
Figure 2:
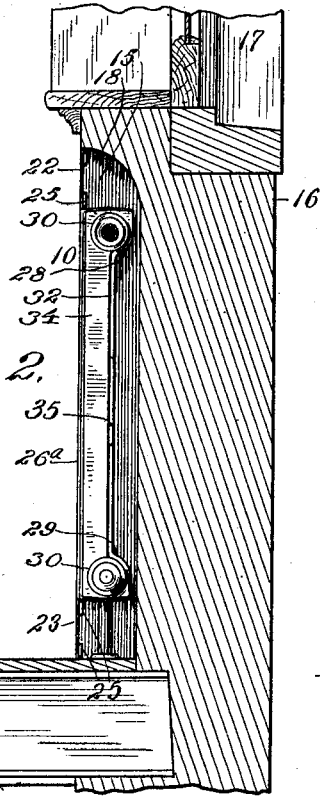
Fig. 2 is a vertical section on the line 2—2 of Fig. 1.

In said drawings, 10 designates the radiator as a whole, comprising a number of connected sections or panels as, for example 11, $11^a$, $11^b$; 12 denotes a supply pipe or riser extending from a source of heating fluid to the top of the end section $11^b$, and 13 denotes a return pipe extending from the bottom of the end section 11 to the boiler. 14 denotes a valve provided in the riser or supply pipe 12 for controlling the admission of heating fluid to the radiator.

The radiator 10 may consist of two end sections or panels 11, $11^b$, together with any number of intermediate sections or panels $11^a$, and in the present instance it is shown installed in a recess or niche 15 provided in the wall 16 of a building below a window 17. The recess 15 has its upper wall portion preferably curved upwardly and outwardly at 18 for the purpose hereinafter described. The front portion or surface of the radiator 10 is disposed in a vertical plane coinciding with that of the inner surface of the wall 16. The recess 15 is made longitudinally longer than the radiator 10 in order to provide vertical spaces between the opposite ends thereof and the end walls of the recess 15 adjacent thereto in order to accommodate the supply pipe 12, return pipe 13, and valves 14 and 31. By preference the radiator is supported in position with its lower edge about four inches from the floor, and its upper edge about the same distance from the curved upper wall portion 18 of the recess 15. The vertical spaces at the opposite ends of the recess 15 are covered with end plates 19, $19^a$, of metal or other suitable material, which are suitably secured in position and provided with openings having hinged doors 20, $20^a$, respectively, to permit of access to the valves 14 and 31.

The longitudinal spaces above and below the radiator are provided with apertured plates or grilles 22, 23, respectively, which are secured in place by suitable fastening means, such as screws 24, engaging lugs 25 extending inwardly from the edges of said vertical plates 19, $19^a$. The lower grille 23 provides openings constituting inlets for the air to be heated by convection during its passage between the concealed or rear portions of the radiator 10 and the adjacent wall portions of the recess 15, and the upper grille 22 provides outlets for the heated air which is deflected forwardly therethrough by the curved upper wall portion 18 of the recess 15.

When the radiator is completely installed the outer or exposed surfaces of the radiator 10, the end plates 19, $19^a$, and grilles 22, 23 will all be in a vertical plane coinciding with that of the inner surface of the surrounding wall of the room.

Each section 11, $11^a$, $11^b$ consists of an integral cast metal unit comprising a substantially flat front wall portion or panel 26 having its front face provided with longitudinal ribs $26^a$, and longitudinal grooves 27 in order to simulate the general appearance of a radiator. Upon the rear side of each wall portion or panel 26, adjacent to its upper and lower edges, are provided transverse headers 28, 29, having reduced intermediate portions $28^a$ and $29^a$, respectively, and the end portions provided with apertures 30 to receive usual nipples for securing a plurality of sections together in end to end relation.

Intermediate the transverse headers 28, 29 are provided a series of vertical tube or conduit portions 32 which are formed integrally with said headers 28, 29 and communicate at their opposite ends therewith. The said tube or conduit portions 32 are preferably of conical form in cross section and have their flat forward wall portions $32^a$ formed as a part of and incorporated with the wall or panel portion 26 of the section.

In order to obtain the maximum heat absorption, and to insure the uniform heating of the section as a whole, the tube or conduit portions 32 are so proportioned that the area of the exposed outer surface of the front wall portion $32^a$ of each tube or conduit portion 32 is equal to somewhat less than one-half of the inner wall surface of the rearwardly extending wall portions $32^b$ of said tube or conduit members. Further, said tube or conduit portions 32 are provided at their opposite longitudinal edges with fin portions 33 formed as prolongations of the front wall portions 32ª of said tube or conduit portions. The width of each of said fin portions 33 should be substantially equal to that of the front wall portion 32ª of a tube or conduit portion 32 so that the said tube or conduit portions shall be separated from each other in each panel or section, and from those of adjacent panels or sections a distance about double that of the width of the front wall portion 32ª of each tube or conduit portion by a fin or web of solid metal, having about the same thickness as said tubular conduit portions 32.

In order to obtain the maximum heating efficiency of the radiator, the portions of the tube or conduit portions 32 with respect to the intervening fin portions 33 per unit of length should preferably approximate those resulting from the following dimensions:

Depth of conduit portions about ..... $1\frac{1}{2}''$
Distance between conduit portions about .............................. $2\frac{1}{2}''$
Width of front wall of conduit portions about .............................. $1\frac{1}{4}''$
Width of fin portions about .......... $1\frac{1}{4}''$
Thickness of metal line about ........ $\frac{9}{32}''$ By constructing a radiator section embodying about the proportions above specified, each tube or conduit portion 32 will have about one-third ($\frac{1}{3}$) of its total periphery disposed in the form of a flat front wall portion 32ª formed as an integral part of the panel 26, and each tube or conduit portion will be separated from the adjacent tube or conduit portion 32 by a fin or panel portion of about double the width of the front wall portion 32ª of each tube or conduit portion, and thereby produce a construction in which the indirect heating surface (fins or intermediate panel portions 33) is so proportioned with respect to the direct heating service (tube or conduit portions 32) as to obtain the maximum absorption of heat by said indirect heating surface or fins necessary to insure the uniform heating of the entire panel or radiator section.

The construction of the sections 11, 11ª, 11ᵇ is the same in each except that the end sections 11, 11ᵇ are provided each upon one of their ends with a rearwardly extending flange portion 34 in order to give a more finished appearance to the radiator as a whole.

Each end section 11, 11ᵇ is provided at its outer vertical edge, about midway between the transverse headers 28, 29, with an integral receptacle portion or chambr 35. Each of said receptacles 35 communicates with its adjacent tube or conduit portion 32. By disposing the receptacle portion 35 midway between the transverse headers 28, 29, the end sections 11, 11ᵇ may be used as a right or left hand section, and the receptacle 35, at either end of the assembled radiator, is thus adapted to receive the tube 36 of an air or relief valve 31, when steam is employed as the heating fluid. When water is employed as the heating fluid, the receptacle 35 and the other parts of the radiator are filled with water, and a suitable relief valve may be applied at an appropriate point.

It is to be noted that while I have shown a panel embodying two vertical tube or conduit portions, the invention is not limited to such construction, as the panel may be formed with any number of tube or conduit portions and fins or web portions whereby the front of the panel will be divided into alternate vertical bands or zones constituting direct and indirect heating surfaces.

Having thus described my said invention, what I claim and desire to secure by Letters Patent is:

A radiator section formed as an integral cast unit comprising a substantially flat panel, a plurality of parallel conduit portions extending rearwardly therefrom, and transverse headers adjacent to opposite ends of said panel communicating with said conduit portions, and a receptacle portion at one edge of said panel communicating with one end of one of said conduit portions and with the header adjacent to said end; the portions of said panel intermediate said conduit portions constituting fin members extending therefrom in prolongation of the front wall portions of said conduit portions, and the combined outer surface of the front wall portions of said conduit portions and the surfaces of its respective fin members aggregating substantially double the surface of the rearwardly extending portions of said conduit portions, substantially as specified.

Signed at New York, in the county of New York, and State of New York, this 9th day of March, one thousand nine hundred and twenty-eight.

CHARLES W. BRABBÉE.